(12) United States Patent
Van Dyke et al.

(10) Patent No.: US 6,412,070 B1
(45) Date of Patent: Jun. 25, 2002

(54) EXTENSIBLE SECURITY SYSTEM AND METHOD FOR CONTROLLING ACCESS TO OBJECTS IN A COMPUTING ENVIRONMENT

(75) Inventors: Clifford P. Van Dyke, Bellevue; Peter T. Brundrett; Michael M. Swift, both of Seattle; Praerit Garg, Kirkland; Richard B. Ward, Redmond, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/157,882

(22) Filed: Sep. 21, 1998

(51) Int. Cl.⁷ .............................................. G06F 12/14
(52) U.S. Cl. ...................... 713/200; 713/201; 713/167; 707/9; 707/10
(58) Field of Search ................................. 713/200, 201, 713/182, 167, 150, 168, 164; 709/225, 229; 707/9, 10, 1, 103, 104

(56) References Cited

U.S. PATENT DOCUMENTS

| | | | | |
|---|---|---|---|---|
| 5,504,814 A | * | 4/1996 | Miyahara | 380/4 |
| 5,675,782 A | * | 10/1997 | Montague et al. | |
| 5,761,669 A | * | 6/1998 | Montague et al. | |
| 5,787,427 A | * | 7/1998 | Benantar et al. | 707/9 |
| 5,905,860 A | * | 5/1999 | Olsen et al. | |
| 6,189,100 B1 | * | 2/2001 | Barr et al. | 713/182 |
| 6,202,066 B1 | * | 3/2001 | Barkley et al. | |
| 6,233,576 B1 | * | 5/2001 | Lewis | |

* cited by examiner

Primary Examiner—Ly V. Hua
(74) Attorney, Agent, or Firm—Lee & Hayes, PLLC

(57) ABSTRACT

A method and computing system for extending access control of system objects in a computing environment beyond traditional rights such as read, write, create and delete. According to the invention, a system administrator or user application is able to create control rights that are unique to the type of object. Rights can be created that do not relate to any specific property of the object, but rather define how a user may control the object. A novel object, referred to as a control access data structure, is defined for each unique control right and associates the control right with one or more objects of the computing environment. In order to grant the right to a trusted user, an improved access control entry (ACE) is defined which holds a unique identifier of the trusted user and a unique identifier of the control access data structure.

46 Claims, 9 Drawing Sheets

155

| 175 ObjectClass | ControlAccessRight |
|---|---|
| 180 ObjectCategory | Control-Access-Right |
| 172 ShowInAdvancedViewOnly | True |
| 160 AppliesTo | GUID of object to which this right applies |
| 170 DisplayName | Title of control access right |
| 165 RightsGUID | Unique GUID of this control access right |

EXTENSIBLE SECURITY SYSTEM AND METHOD FOR CONTROLLING ACCESS TO OBJECTS IN A COMPUTING ENVIRONMENT

FIELD OF THE INVENTION

This invention relates generally to secure computing environments and, more particularly, to an extensible method and system for maintaining control access rights in a computing environment.

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawing hereto: Copyright© 1998, Microsoft Corporation, All Rights Reserved.

BACKGROUND OF THE INVENTION

In order to control the management, protection and distribution of sensitive information, an organization defines a security policy and implements the policy through various rules and practices. A security policy has several objectives. First, a security policy strives to maintain the confidentiality of the sensitive information by protecting the information from improper disclosure to unauthorized users. Second, a security policy seeks to maintain the integrity of the information by ensuring that users do not modify data to which they are not authorized and authorized users do not corrupt the information by improper operations. Finally, the policy seeks to minimize any burden on the availability and accessibility of the information to authorized users incurred as a result of the policy.

In an organization's computing environment, an operating system controls access to system objects such as files and network devices. The operating system enforces the organization's security policy based on configured permissions for accessing the resources. It is often difficult to fully implement an organization's security policy because conventional operating systems have a predefined set of access rights. Conventional systems employ a limited permissions mask. The permissions mask contains a fixed number of bits, such as 16 bits or 32 bits, where each bit corresponds to a unique access right. A system administrator is able to enforce the organization's security policy only to the extent the fixed permissions allow and is limited to granting or denying individual permissions. Thus, in conventional operating systems, a system administrator or software developer is confined to the operating system's predefined permissions and, therefore, is often unable to fully implement the organization's security policy.

For the reasons stated above, and for other reasons stated below which will become apparent to those skilled in the art upon reading and understanding the present specification, there is a need in the art for an extensible security system in which permissions can be dynamically created, granted and removed. There is a need for such a system in which unique control rights can be defined manually by a system administrator or programmatically by applications executing within the computing environment.

SUMMARY OF THE INVENTION

The above-mentioned shortcomings, disadvantages and problems are addressed by the present invention that will be understood by reading and studying the following specification. To solve these problems, the invention provides an extensible security system and method that provides for controlling objects beyond traditional access rights such as read, write, create and delete. The methods and systems of the invention allow a system administrator or user application to dynamically create unique control rights. According to the invention, access rights can be created that do not necessarily relate to any specific property of the object, but rather define how a user may control the object. A novel object, referred to as a control access data structure, is defined for each unique control right and associates the control right with one or more objects of the computing environment. In order to grant the access right to a trusted user, an improved access control entry (ACE) is defined which holds a unique identifier of the trusted user and a unique identifier of the control access data structure.

BRIEF DESCRIPTION OF THE DRAWINGS

FIG. 3 is a block diagram illustrating a control access data structure used by the computing system to maintain defined control access rights;

FIGS. 7, 8, 9 and 10 further illustrate an administration tool for defining and granting control access rights to objects within the computing system.

DETAILED DESCRIPTION OF THE INVENTION

In the following detailed description of exemplary embodiments of the invention, reference is made to the accompanying drawings that form a part hereof and, which show by way of illustration, specific exemplary embodiments in which the invention may be practiced. These embodiments are described in sufficient detail to enable those skilled in the art to practice the invention. It is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into four sections. In the first section, the hardware and the operating environment in conjunction with which embodiments of the invention may be practiced are described. In the second section, a detailed description of various embodiments of an extensible security system for maintaining control access rights in a computing environment according to the invention is presented. In the third section, methods for operating an exemplary embodiment of the invention are provided. This section includes a detailed example illustrating the use of an administrative tool to facilitate the provided methods. Finally, in the fourth section, a conclusion of the detailed description is provided.

Hardware and Operating Environment

Figure 1:
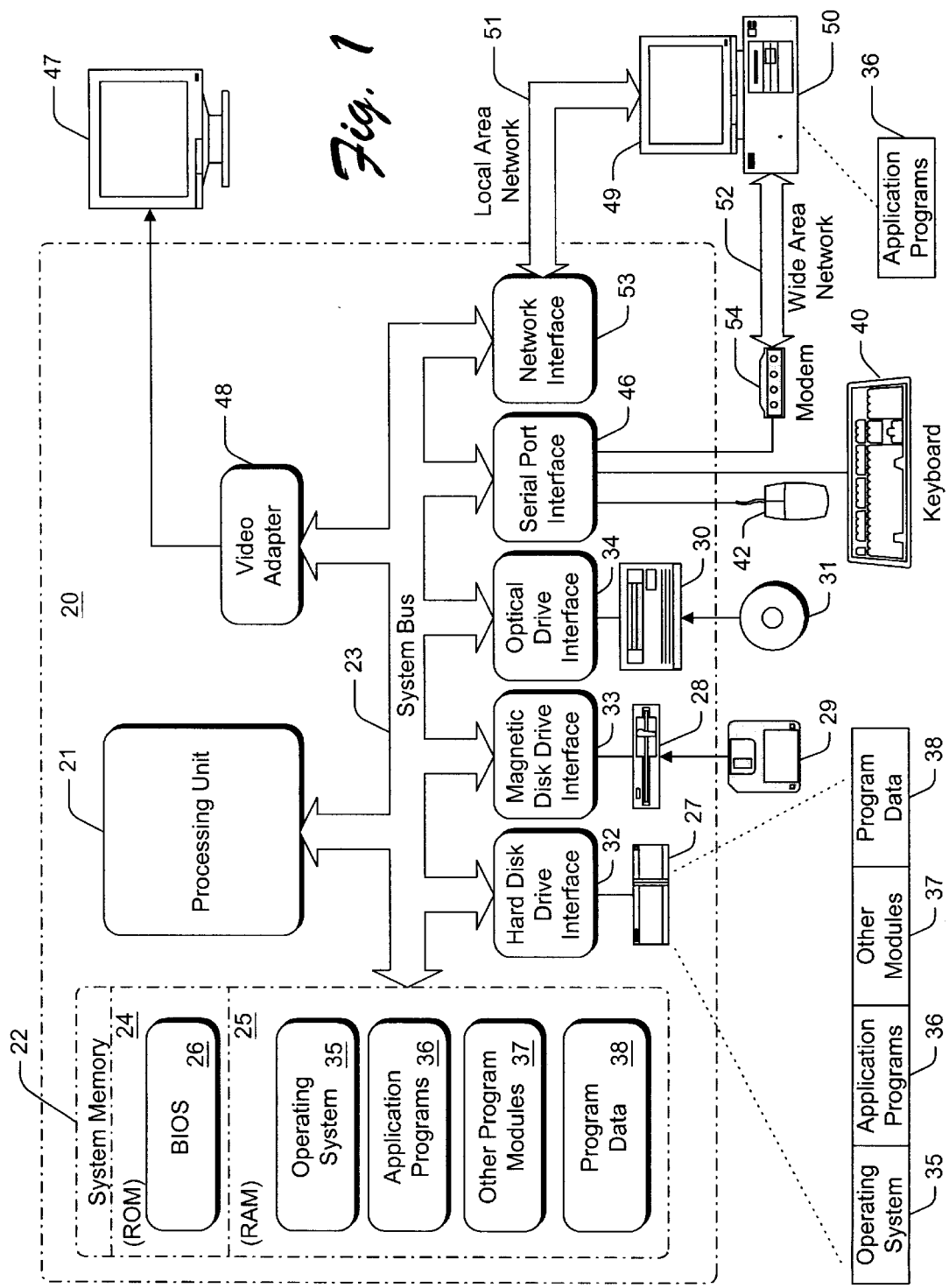
FIG. 1 shows a diagram of the hardware and operating environment in conjunction with which embodiments of the invention may be practiced.

FIG. 1 is a diagram of hardware and operating environment with which various embodiments of the invention may be practiced. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20 having processing unit 21, system memory 22, and system bus 23 that operatively couples various system components including system memory 22 to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. Basic input/output system (BIOS) 26 contains routines that help to transfer information between elements within computer 20, such as during start-up, and is stored in ROM 24. Computer 20 further includes hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored by hard disk 27, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to processing unit 21 through serial port interface 46 that is coupled to the system bus, but may be connected by other interfaces, such as a parallel port, game port, or a universal serial bus (USB). Monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in offices, enterprise-wide computer networks, intranets and the Internet.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

System Level Embodiments of the Invention

Figure 2:
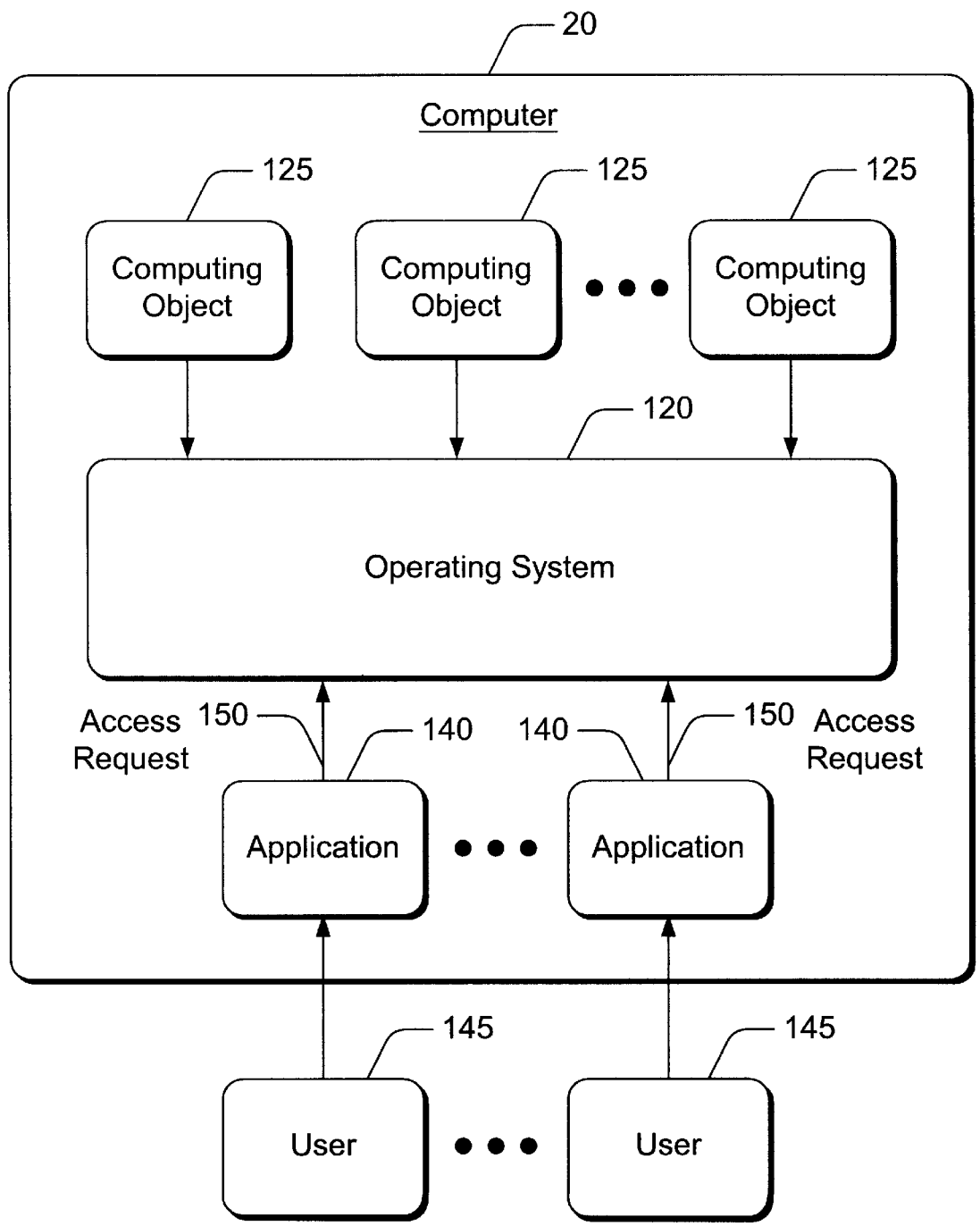
FIG. 2 is a block diagram illustrating one embodiment of a computing system having an operating system that facilitates creating, granting and authenticating control access rights according to the invention.

FIG. 2 illustrates computer 20 in which operating system 120 controls access to computing objects 125. Computing objects 125 represent unique system resources such as network servers, stored data files, E-mail gateways, domains, registry keys, Active directory objects, system events and even semaphores used by operating system 120. Additionally, computing objects 125 represent objects defined by Applications 140 which represent computational entities such as user applications, mail handlers and proxy servers that are executing on behalf of a corresponding user 145. In one embodiment of computer 20, each application 140 encapsulates a single thread of execution. In another embodiment, each application 140 represents a process having one or more related threads that share the same address space.

Each application 140 issues an access request 150 to operating system 120 when desiring to operate on one of the computing objects 125. For example, applications 140 may issue requests to mount a network drive, retrieve information from a tape drive or delete a particular file. Operating system 120 represents any process or service executing on computer 20 that controls access to objects 125.

Often, applications 140 issue an access request 150 based on an action taken by corresponding user 145. For example, user 145 may have issued a command to read or write a file, or kill a process, etc. To control these operations, operating system 120 maintains security information for each object 125. Upon receiving access request 150, operating system 120 examines the security information for each object 125 and determines whether application 140 and the corresponding user 145 have permissions to carry out the desired operation on the requested object 125. Based on this determination, operating system 120 enforces access request 150.

In order to facilitate an extensible access control mechanism, the invention defines a new object referred to hereafter as a control access right. According to the invention, users 145 can dynamically create unique control access rights for one or more objects 125. As used herein, control access rights do not control access to data within objects 125, but control access to an operation, or action, to be performed on or by object 125. For example, Appendix I lists control access rights provided by one embodiment of operating system 120. After defining new control access right, users 145 grant the new rights to one or more users 145, thereby permitting corresponding applications 140 to perform the desired operations.

FIG. 3 illustrates one embodiment of a control access data structure 155 that is used by operating system 120 to represent the control access right. The "AppliesTo" field 160 associates the control access data structure 155 to one of the objects 125 (FIG. 2) within computer 20. Control access data structure 155 may contain more than one "AppliesTo" field such that the defined right may be applied to more than one object 125. Each of these fields contains a unique identifier, such as a GUID, that identifies a particular object-class to which this control right applies. The "RightsGUID" field 165 contains a unique identifier for this particular control right. As described in detail below, "RightsGUID" field 165 is used by operating system 120 to verify access control. The "DisplayName" field 170 stores a text string, such as "Change Password", that is displayed by an administrative tool when presenting information of the defined control right to a system administrator. The "ShowInAdvanceViewOnly" field 172 assists the administrative tool in displaying the information. The "ObjectClass" field 175 and the "ObjectCategory" field 180 hold information regarding the object-type for control access data structure 155.

The definition of control access data structure 155 is stored in a schema of a directory service (DS). Specific instances of control access data structure 155 are maintained in an "extended rights" container of the active directory corresponding to user 145 that created the particular right. Each specific instance of control access data structure 155 has a unique identifier stored in "RightsGUID" field 165.

When user 145 logs on to computer 20, operating system 120 verifies an entered password according to information stored in a security database. If the password is authenticated, operating system 120 creates a security access token that includes a unique security ID for the user and security IDs for any groups to which user 145 belongs. Every application 140 that executes on behalf of user 145 has a copy of the access token. When application 140 issues access request 150, operating system 120 refers to the security ID within the corresponding security access token. Operating system 120 compares the stored security IDs with a list of access permissions for the requested object 125 to ensure that user 145 has sufficient permission to perform the desired operation on object 125.

More specifically, each object 125 is associated with a security descriptor that defines corresponding access control information. When application 140 issues access request 150, operating system 120 compares the security IDs stored in the access token of the requesting application 140 with security information in the security descriptor of the requested object 125. Security descriptors for objects 125 contain a variety of security information including one or more access-control lists (ACL's). Each ACL contains one or more access-control entries (ACEs) that identify a trusted application 140 and specify permitted access rights for that trustee. To determine whether to allow application 140 to operate on a requested object 125 as requested in access request 150, operating system 120 examines each ACE in the ACL of the requested object 125. If requested object 125 does not have an ACL, operating system 120 grants full access to all applications 140. If requested object 125 has an empty ACL, operating system 120 denies all attempts to access requested object 125 because the corresponding ACL does not allow any access rights.

Figure 4:
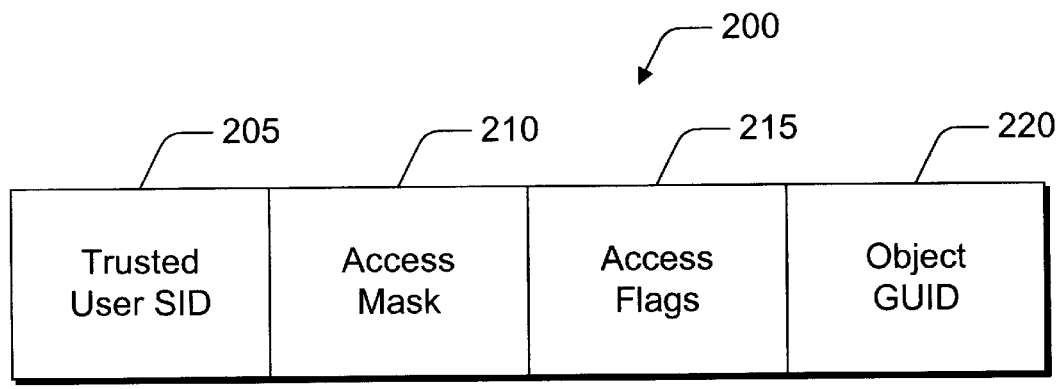
FIG. 4 illustrates an improved access control entry by which the invention grants user applications control rights to operate on objects within the computing system.

FIG. 4 illustrates an improved access control entry (ACE) 200 by which the invention is able to grant applications 140 rights to operate on objects 125. ACE 200 includes security identifier (SID) 205 that identifies the trusted user 145 to which the ACE applies. Access mask 210 specifies access rights controlled by the ACE and is described in detail below. Access flags 215 indicate a variety of information including the type of ACE and whether child objects 125 can inherit the ACE 200 from a parent object 125 to which the ACL is attached. Finally, object GUID 220 is a unique identifier that indicates the object type to which ACE 200 applies.

Figure 5:
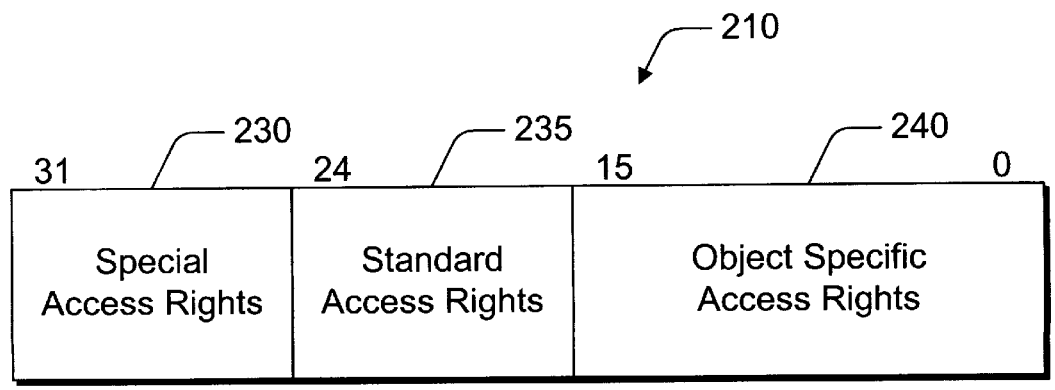
FIG. 5 illustrates a block diagram of an access mask of the improved access control entry.

FIG. 5 illustrates an exemplary embodiment of access mask 210 of ACE 200 (FIG. 4) and defines access rights for a particular object type. Generally speaking, operating system 120 grants or denies access requests 150 based on access mask 210. According to one embodiment, access mask 210 is a 32-bit integer where each bit corresponds to a particular access right that is supported by the corresponding object 125. As illustrated in FIG. 5, the 32 bits of access mask 210 are grouped into three access type categories: Special Access Rights 230, Standard Access Rights 235 and Specific Access Rights 240.

Standard access rights 235 are generic rights that can be applied to all objects 125 and include:

DELETE—allows the object to be deleted.

READ_CONTROL—allows the object's security descriptor to be read.

WRITE_DAC—allows the DACL on the object to be modified.

WRITE_OWNER—allows the owner of the object to be modified.

SYNCHRONIZE—allows the object to be waited on for synchronization purposes.

Unlike the standard access rights 235, specific access rights 240 are object specific. Thus, each object-type can have its own list of access rights. Specific access rights 240 provide a fine granularity of protection for the corresponding object 125. As shown in FIG. 5, there can be at most 16 object specific rights. According to the invention, operating system 120 defines one of specific access rights 240 as "DS_CONTROL_RIGHT". When set, the DS_CONTROL_RIGHT flag indicates that access to corresponding object 125 by user 145 having trusted SID 205 (FIG. 4) is controlled by a defined access control data structure 155 (FIG. 3).

Referring again to FIG. 4, when the DS_CONTROL_RIGHT flag within access mask 210 is set, object GUID 220 holds a unique identifier of a corresponding access control data structure 155. Access request 150 specifies the desired access in the form of an access mask and optionally a list of object GUIDs that identify control rights. Operating system 120 compares the desired access mask and control access right GUIDs in access request 150 with the ACEs contained in the ACL of the security descriptor for the requested object 125. If the ACL of the requested object contains an improved access control entry 200 having an access mask 210 and object GUID 220 that matches the desired access mask and control access right GUID specified in access request 150, then operating system 120 grants or denies access to requested object 125 according to the matching control access right in access request 150. If not, operating system 120 examines the remaining ACE's 200 of the ACL belonging to requested object 125. If no ACE 200 grants the requested operation, operating system 120 denies access request 150.

The system level overview of the operation of exemplary embodiments of the invention has been described in this section of the detailed description. The invention describes a new access control data structure that facilitates the dynamic creation and assignment of access rights that are unique to the type of object. The invention controls operations performed on various system objects including those that are visible to a user interface, such as files and printers, and those that are hidden from users, such as processes, system events, semaphores and named pipes. Those of ordinary skill within the art will appreciate that, in one embodiment, the invention allows a user to grant or deny unique control access rights for individual objects using an administrative tool. In addition, the invention allows user applications to programmatically define, grant and deny control access rights via calls to an operating system or other controlling process.

Methods of an Exemplary Embodiment of the Invention

In the previous section, a system level overview of the operation of exemplary embodiments of the invention was described. In this section, the particular methods performed by the exemplary embodiments are described by reference to a flowchart. The methods to be performed by the embodiments constitute computer programs made up of computer-executable instructions. Describing the methods by reference to a flowchart enables one skilled in the art to develop such programs including such instructions to carry out the methods on suitable computing systems from computer-readable media.

Figure 6:
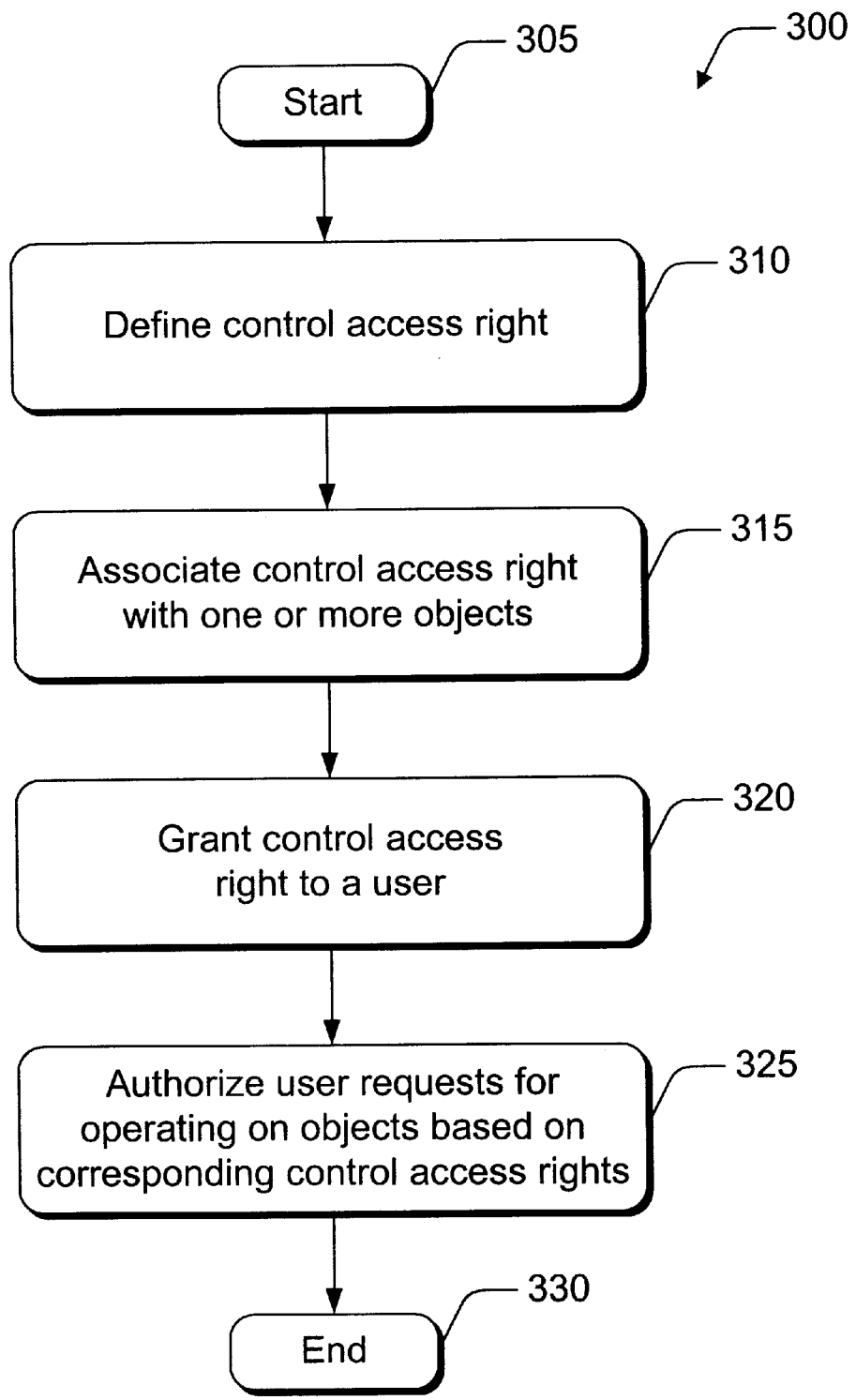
FIG. 6 is a flowchart illustrating one mode of operation of the computing system that defines control access rights and authenticates user requests based on the defined rights.

FIG. 6 illustrates a flowchart of one exemplary method of operation of the above-described extensible security system according to the invention. Flowchart 300 illustrates the steps the invention undertakes to provide extensible access control for objects 125 (FIG. 1) within computer 20.

Operating system 120 (FIG. 1) begins execution with step 305 and immediately proceeds to step 310. In step 310, a new access control data structure 155 (FIG. 3) is defined. This definition may be initiated in one of two ways. First, a system administrator may command operating system 120 to create access control data structure 155 via an administrative tool. Second, a new access control data structure 155 may be programmatically defined via applications 140. In one embodiment, applications 140 create a new access control data structure 155 by making appropriate system calls to operating system 120.

After defining a new control right by creating an access control data structure 155 in step 310, the control right must be assigned to a specific object 125 within computer 20. In step 315, operating system 120 associates the newly created access control data structure 155 with one or more of the objects 125. More specifically, operating system 120 sets each "AppliesTo" field 160 (FIG. 3) of access control data structure 155 to contain the unique identifier of an object class to which the new control right applies. Operating system 120 also creates a unique identifier for the control access night and sets the "RightsGUID" 165 with the identifier to define the unique value.

Next, in step 320, the newly created control right is granted to a trusted user 145 for a specific object 125 by associating access control data structure 155 with the trusted user 145. In step 320, operating system 120 adds an ACE 200 (FIG. 4) to the ACL of the security descriptor of the corresponding object 125. Operating system 120 sets trusted user SID 205 of the added ACE 200 to the unique identifier of the trusted user 145. Operating system 120 also sets the DS_CONTROL_RIGHT flag of specific access mask 240 (FIG. 5) of ACE 200 (FIG. 4) to indicate permission is controlled by the access control data structure 155 defined in step 310. In this manner, operating system 120 associates the control access right with a trusted user 145. Thus, upon completing step 320, the created control access data structure 155 is associated with one or more objects 145 and with a trusted user 145; i.e., the control right has been defined and granted.

In step 325, operating system 120 authorizes access requests 150 based on control rights created by users 145 and applications 140. More specifically, when determining whether to allow application 140 to operate on a requested object 125, operating system 120 retrieves the security descriptor for the requested object 125. Next, operating system 120 examines the access control list (ACL) stored within the retrieved security descriptor. Each access control entry (ACE) of the ACL is examined for a trusted user SID 205 that matches the security ID of the requesting application 140. For each match, operating system 120 compares the matching ACE's object GUID 220 with the desired control right GUID specified by Application 140. If the ACE's object GUID 220 matches, then operating system 120 grants access request 150.

According to the invention, applications 140 are able to define unique control access rights and evaluate whether a requesting user 145 has the right to control the requested object 125 based on the defined control access rights. In order to evaluate whether a subject can control an object as requested, applications 140 command operating system 120 to evaluate each ACE in the object's ACL. In one embodiment, applications 140 command operating system 120 to perform access checks by invoking specialized system calls entitled AccessCheckByType and AccessCheckByTypeResultList. In order to perform an operation that requires a permissions check, such as changing a user account password, an application 140 invokes the AccessCheckByType system call and passes in the ACL from the requested object 125 as well as the desired operation and a list of object type GUIDs. Based on the parameters, operating system 120 determines whether the calling application 140 is permitted to perform the operation. Because applications 140 are not allowed to directly manipulate the security information within the security descriptor of objects 125, operating system 120 provides functions for setting and retrieving the security information in the security descriptor. In addition, there are functions for creating and initializing a security descriptor for a new object 125. Appendix II provides further details regarding the system calls that are available from operating system 120 in order to determine whether user 145 is authorized to control an object 125 as requested.

Steps 310, 315, 320 and 325 of flowchart 300 illustrate defining, granting and authorizing unique access control rights according to the methods performed by the exemplary embodiments of the invention. Flow chart 300 terminates in step 330.

Figure 7:
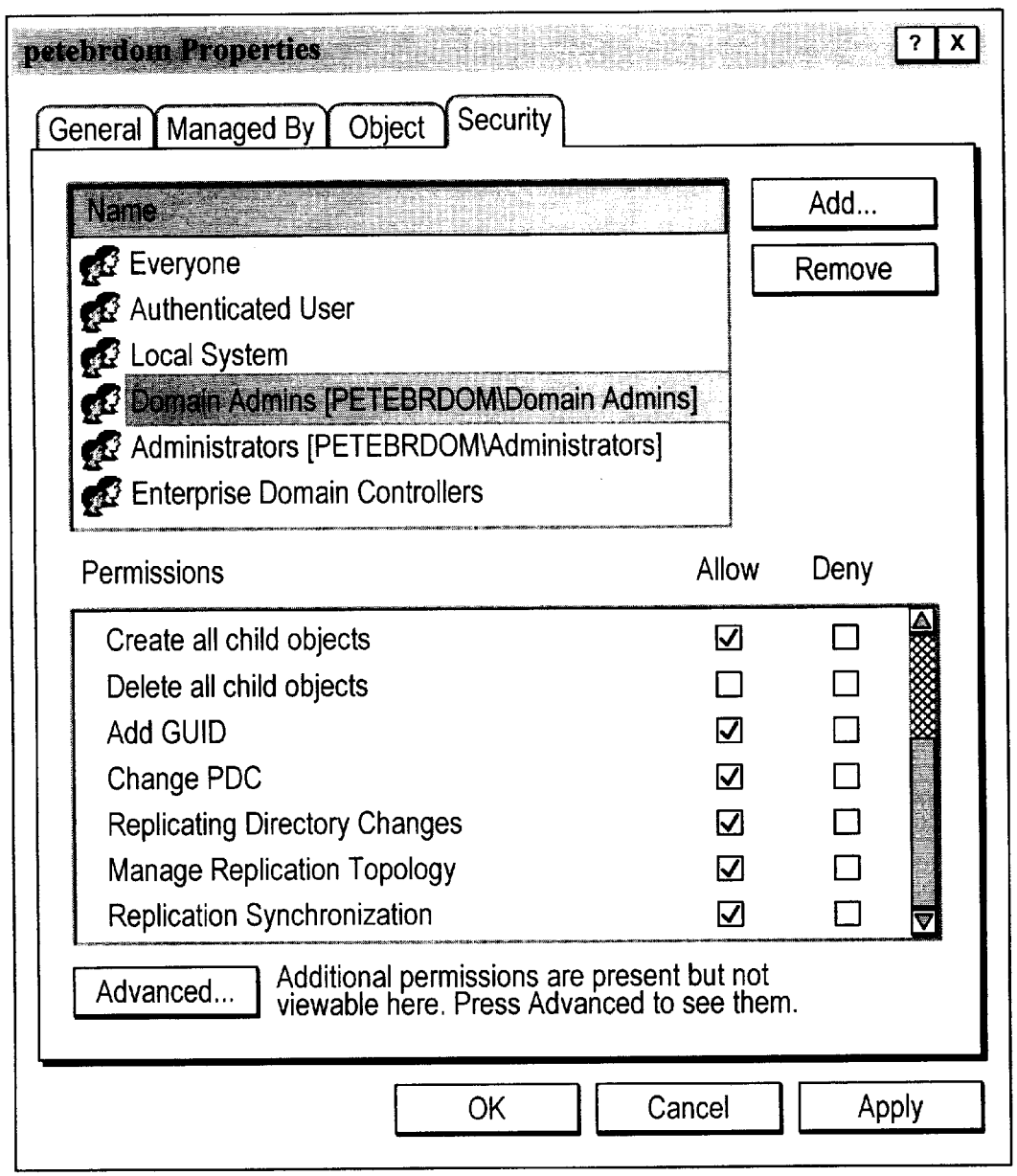

FIGS. 7 through 10 further illustrate the use of an administration tool to perform the above-described methods. In FIG. 7, an administrative tool 400, such as the Active Directory Management MMC administration tools Snap-in for Windows® NT, to select an object 125 and view the security properties of the selected object 125. Via administrative tool 400, users 145 can view defined control access rights of objects 125. When a user 145 wants to manage the security of a particular object 125, administrative tool 400 queries a schema of the corresponding object 125 in order to display a list of all the control access rights that have been defined for that object 125.

Figure 8:
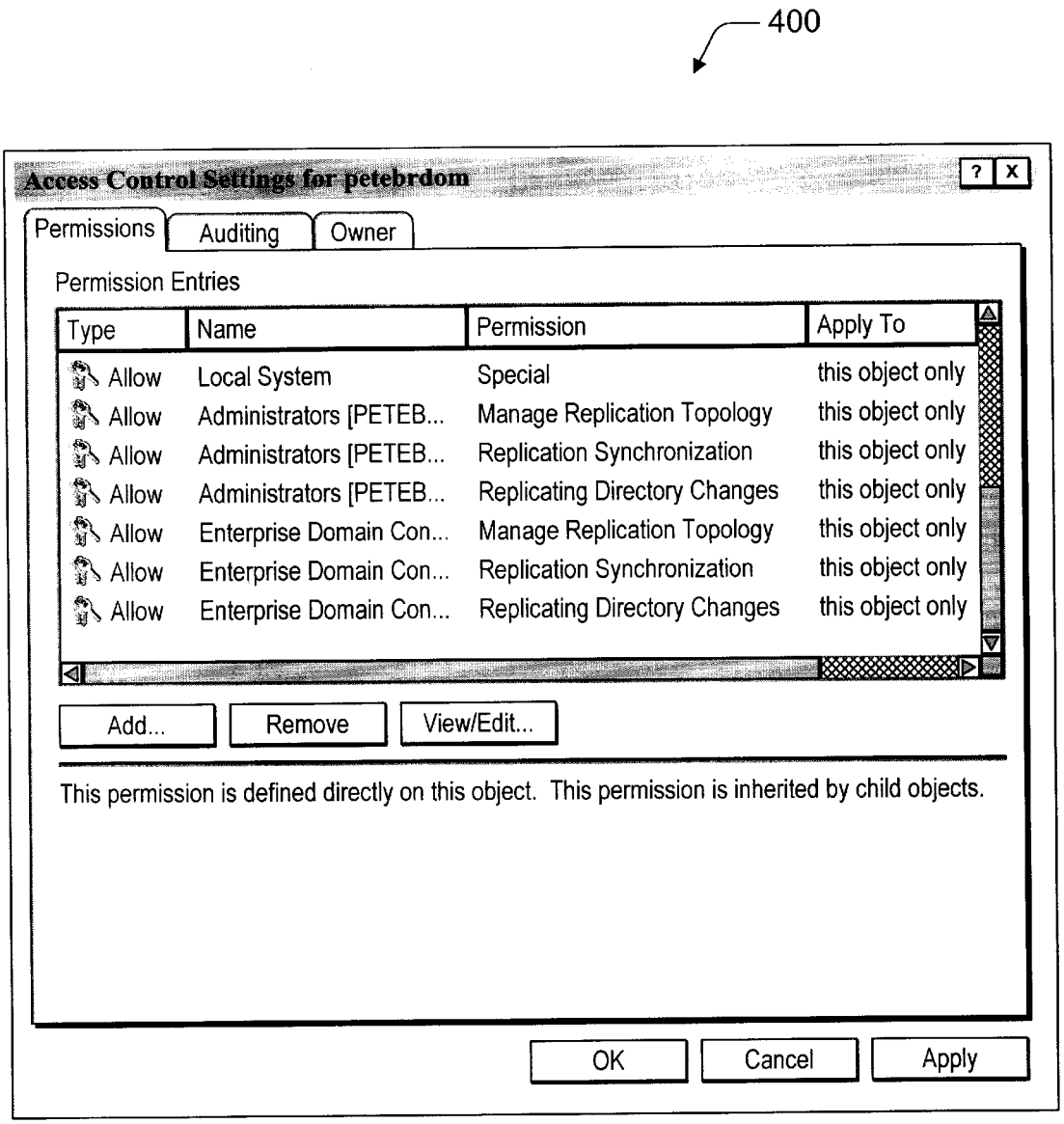

For example, in FIG. 7, administration tool 400 displays access permissions for a "domain" object. Several of the displayed access permissions are control access rights that are not associated with a particular property of the object. More specifically, Add GUID, Change PDC, Replicating Directory Changes, Manage Replication Topology, and Replication Synchronization are control access rights. As illustrated in FIG. 7, one type of user 145, Domain Administrators, are granted all of these control access rights. FIG. 8 illustrates an advanced view of the control access rights in which the defined control access rights are shown under the Permission column.

Figure 9:
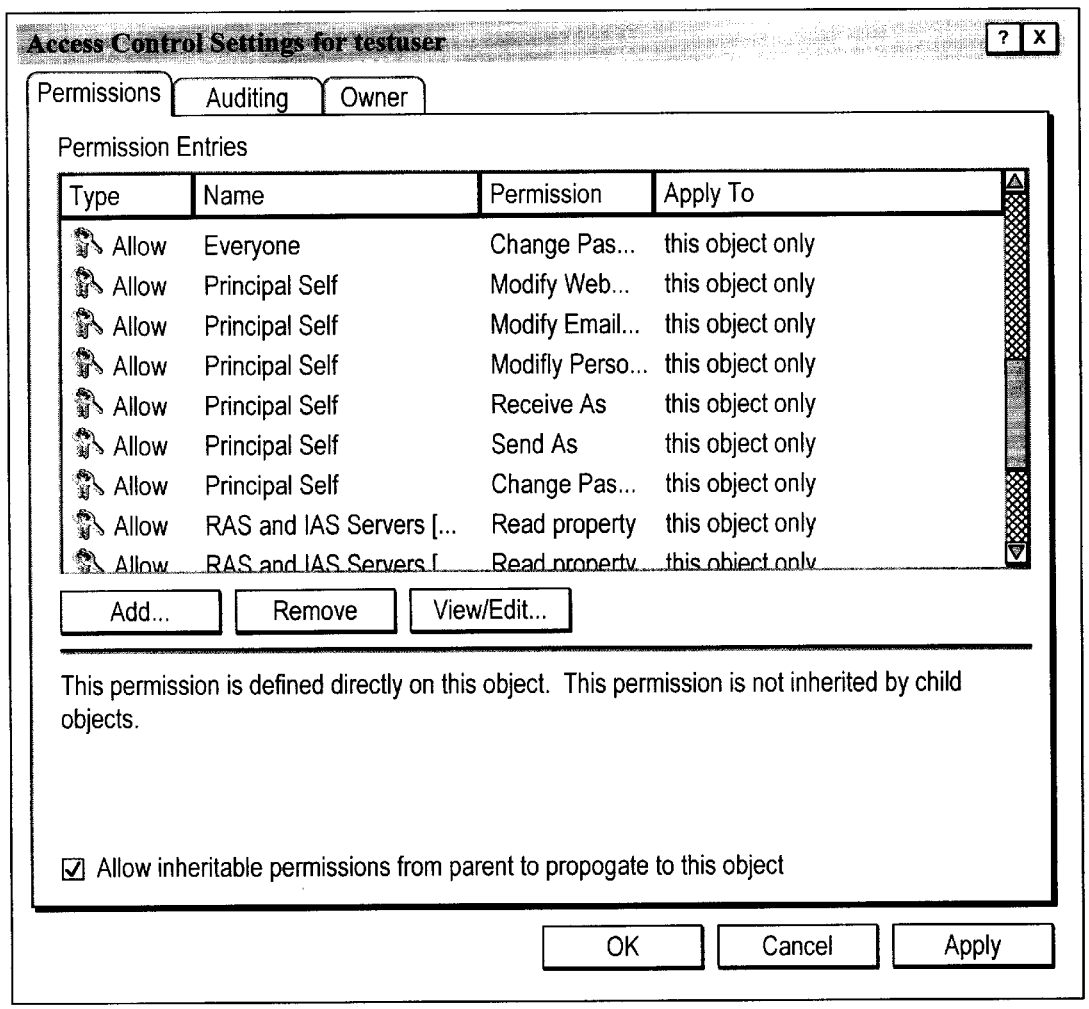

In order to further illustrate the use of control access rights according to the invention, consider an example in which control access rights on user objects are used by an electronic mail application to determine if one user 145 can send/receive mail as another user 145. A typical need for such a control access right is an executive assistant who helps manage an executive's mail account. Typical control access rights that may be defined and used by the mail application according to the invention could be: (1) Send As, (2) Receive As. FIG. 9 illustrates administrative tool 400 displaying permissions of a user object 125 according to the invention in which all user 145 have the rights to Send As/ReceiveAs themselves.

Figure 10:
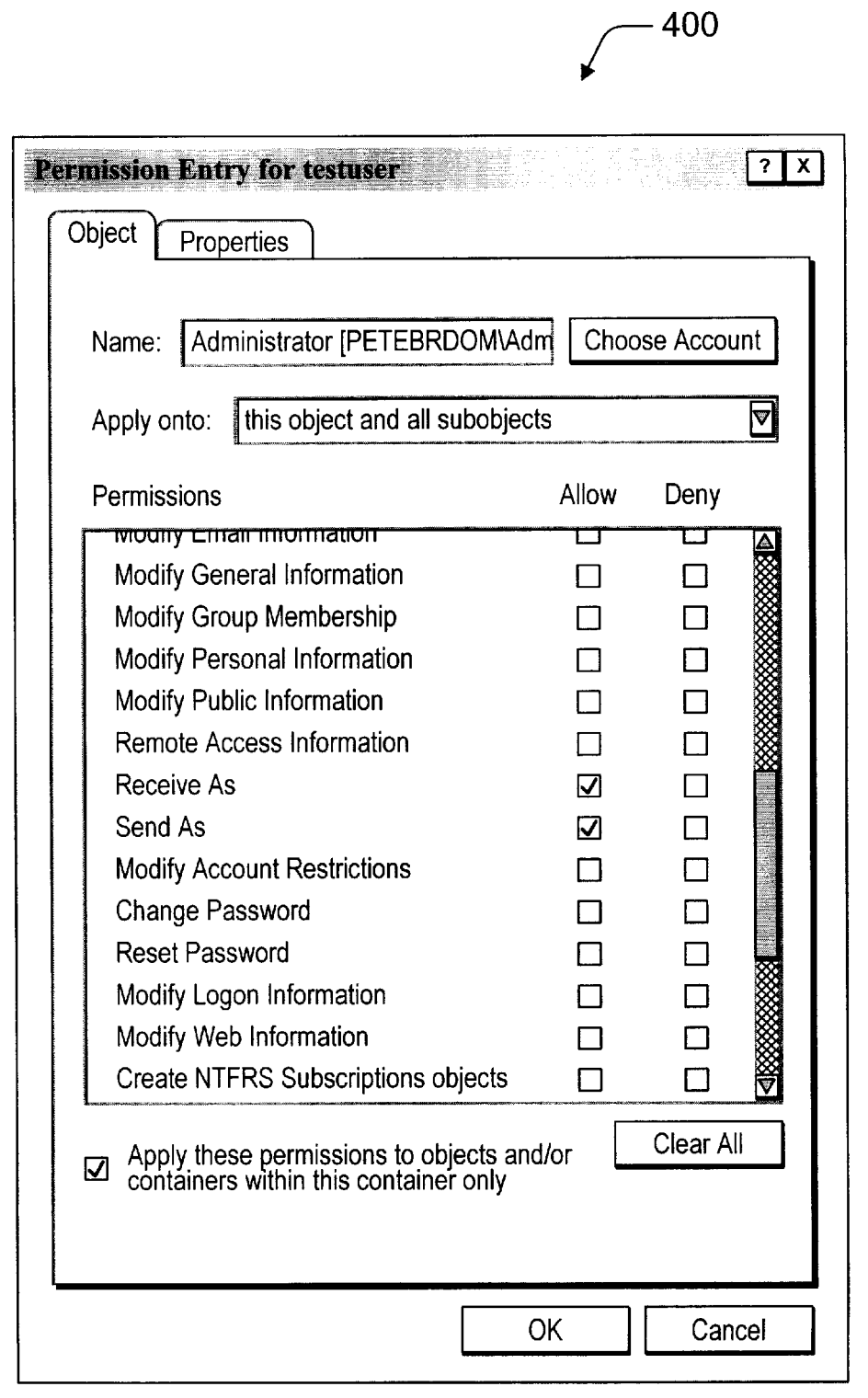

A user 145 can grant control rights to another user 145 by manually pressing the "Add" button of administrative tool 400 and selecting the control rights from a list of "properties" associated with the user object class. FIG. 10 shows administrative tool 400 displaying control rights along with all the other individual properties of the user object after a user 145 presses the "Add" button. As illustrated in FIG. 10, the selected user object 125 currently has control access rights "Send As" and "Receive As". As described above, when a user 145 requests that a control access right be added to an object 125 administrative tool 400 commands operating system 120 to build an appropriate access control entry (ACE) and add it to the access control list (ACL) for the corresponding object 125.

The particular methods performed by the various exemplary embodiments of the invention have been described. The methods performed by the embodiments have been shown by reference to a flowchart 300 (FIG. 6), including all the steps from 305 to step 320, and by way of example.

Conclusion

An extensible method and system for dynamically granting and defining control access rights for objects within a computing environment have been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. For example, those of ordinary skill within the art will appreciate that, in one embodiment, the invention allows a user to create, grant and deny unique control access rights for individual objects in the computing environment using an administrative tool. In addition, the invention provides an operating system having system calls such that applications are able to programmatically define, grant and deny control access rights. Control access rights that are defined by applications are automatically read and displayed to users via the administrative tool. Therefore, it is manifestly intended that this invention be limited only by the following claims and equivalents thereof.

APPENDIX I

Extended Rights List
This appendix lists control access rights automatically created and stored in an extended rights container by Windows ® NT when an active directory is initialized:

| | |
|---|---|
| 1. | Domain Administer Server |
| 2. | Change Password |
| 3. | Reset Password |
| 4. | Send As |
| 5. | Receive As |
| 6. | Send To |
| 7. | Modify Domain Password & Lockout Policies |
| 8. | Modify General Information |
| 9. | Modify Account Restrictions |
| 10. | Modify Logon Information |
| 11. | Modify Group Membership |
| 12. | Modify Lockout Policy |
| 13. | Modify Password Policy |
| 14. | Modify Domain Policy Configuration |

APPENDIX I-continued

Extended Rights List
This appendix lists control access rights automatically created and stored in an extended rights container by Windows ® NT when an active directory is initialized:

| | |
|---|---|
| 15. | Modify Domain Policy Reference |
| 16. | Modify Privileges |
| 17. | Modify Logon Rights |
| 18. | Modify Local Policy Reference |
| 19. | Modify Audit Policy |
| 20. | Modify Administrative Roles |
| 21. | Open Address Book |
| 22. | Modify Email Information |
| 23. | Modify Personal Information |
| 24. | Modify Web Information |
| 25. | Replicating Directory Changes |
| 26. | Replication Synchronization |
| 27. | Manage Replication Topology |
| 28. | Change Schema Master |
| 29. | Change Rid Master |
| 30. | Abandon Replication |
| 31. | Do Garbage Collection |
| 32. | Recalculate Hierarchy |
| 33. | Allocate Rids |
| 34. | Change PDC |
| 35. | Add GUID |
| 36. | Change Domain Master |
| 37. | Modify Public Information |
| 38. | Receive Dead Letter |
| 39. | Peak Dead Letter |
| 40. | Receive Journal |
| 41. | Peak Journal |
| 42. | Receive Message |
| 43. | Peak Message |
| 44. | Send Message |
| 45. | Receive Journal |
| 46. | Open Connector Queue |
| 47. | Apply Group Policy |
| 48. | Remote Access Information |

APPENDIX II

Access Verification API
This appendix details Windows ® NT API calls that allow applications to verify control access rights. For each API, the format is presented along with a brief discussion of the parameters.

AccessCheckByType

```
BOOL AccessCheckByType (
    PSECURITY_DESCRIPTOR pSecurityDescriptor,
    PSID  PrincipalSelfSid,
    HANDLE  ClientToken,
    DWORD  DesiredAccess,
    POBJECT_TYPE_LIST  ObjectTypeList,
    DWORD  ObjectTypeListLength,
    PGENERIC_MAPPING  GerneticMapping,
    PPRIVILEGE_SET  PrivilegeSet,
    LPDWORD  PrivilegeSetLength,
    LPDWORD  GrantedAccess,
    LPBOOL  AccessStatus
    );
```

Parameters:
This API takes the Object security descriptor, desired access mask, and a list of ObjectType GUIDs and returns a True/False status value based on whether the desired access is permitted to the porperty set(s) and properties of the DS object.

| | |
|---|---|
| PrincipalSelfSid | If the object being access checked is an object which represents a principal (e.g., a user object), this parameter should be the SID of the object. When evaluating access, this SID locically replaces the SID in any ACE continuing the constant PRINCIPAL_SELF_SID. This parameter should be NULL if the object does not represent a principal. |

APPENDIX II-continued

Access Verification API
This appendix details Windows ® NT API calls that allow applications to verify control access rights. For each API, the format is presented along with a brief discussion of the parameters.

| | |
|---|---|
| ObjectTypeList | Supplies a list of GUIDs representing the object (and sub-objects) being accessed. If no list is present, AccessCheckByType behaves identically to AccessCheck. |
| ObjectTypeListLength | Specifies the number of elements in the ObjectTypeList. |

The ObjectTypeList parameter is an array of the object type list elements:

```
typedef struct _OBJECT_TYPE_LIST
    USHORT Level;
    USHORT Sbz;
    GUID *ObjectType
} OBJECT_TYPE_LIST, *POBJECT_TYPE_LIST;
``` where

| | |
|---|---|
| Level | An ordinal indicating the level of this element. Level 0 represents the object itself. Level 1 indicates a sub-object (for example, a propety set) of the object. Level 2 indicates a sub-object (for example, a property) of the level 1 sub-object, etc. There can be a maximum of 5 levels (numbered 0 through 4). |
| Sbz | Should be zero. Reserved for future use. |
| ObjectType | A pointer to the GUID for the object, property set, or property. The ObjectTypeList should not contain two identical GUIDs. |

AccessCheckByType evaluates all ACEs in the DACL in the supplied security descriptor. If an object type specific ACE is encountered, the object type in the ACE is found in the ObjectTypeList. If the object type cannot be found in the ObjectTypeList, the ACE is ignored.
An ACE granting access to a particular object (or sub-object) is considered
to grant that same access to all the sub-objects. For instance, if an ACE grants DS_READ_PROPERTY access to property set, that ACE grants DS_READ_PROPERTY accesss to all of the properties within the property set. Once a particular access is granted to all of the sub-objects of
an object, that access is granted to the object. For instance, if
DS_READ_PROPERTY access is individually granted to each property of a property set, DS_READ_PROPERTY access is granted to the whole property set.
And ACE not specifying an object type is considered to match the first entry in the ObjectTypeList (that is, the object itself).
An ACE denying access to a particular object (or sub-object) is considered to deny that same access to all the sub-objects.
Once processing is done, the returned GrantedAccess and AccessStatus is set to refect whether access is granted to the object as described. That is, does the specific ClientToken have the DesiredAccess to all of the property sets and properties requested.

AccessCheckByTypeResultList

The AccessCheckByTypeResultList API returns the intermediate results of an AccessCheckByType. That is, the access allowed to each element of the ObjectTypeList is returned.

```
BOOL  AccessCheckByTypeResultList (
    PSECURITY_DESCRIPTOR  pSecurityDescriptor
    PSID  PrincipalSelfSid,
    HANDLE  ClientToken,
    DWORD  DesiredAccess,
    POBJECT_TYPE_LIST  ObjectTypeList,
    LPDWORD  ObjectTypeListLength,
    PGENERIC_MAPPING  GenericMapping,
    PPRIVILEGE_SET  PrivilegeSet,
    LPDWORD  PrivilegeSetLength,
    LPDWORD  GrantedSetList,
    LPDWORD  AccessStatusList
    );
```

Note that the size of the GrantedAccessList and AccessStatusList are determined by the ObjectTypeListLength parameter.
This routine is almost the same as AccessCheckByType( ). The following parameters are different than the parameters to AccessCheckByType( ):

| | |
|---|---|
| PrincipalSelfSid | If the object being access checked is an object which represents a principal (e.g., a user object), this parameter should be the SID of the object. When evaluating access, this SID, logically replaces the SID in any |

APPENDIX II-continued

Access Verification API

This appendix details Windows ® NT API calls that allow applications to verify control access rights. For each API, the format is presented along with a brief discussion of the parameters.

| | |
|---|---|
| | ACE containing the constant PRINCIPAL_SELF_SID. This parameter should be NULL if the object does not represent a principal. |
| ObjectTypeListLength | Specifies the number of elements in the ObjectTypeList. At least one element must be specified. |
| GrantedAccessList | Pointer to an array the function fills with the access mask indicating which access rights were granted to the corresponding element of ObjectTypeList. |
| AccessStatusList | Pointer to an array the function fills with a status code indicating whether the desired access was granted to the corresponding element of ObjectTypeList. |

We claim:

1. A computer-readable medium having stored thereon a control access data structure for defining an access right to an operation of one or more objects within a computing environment, the control access data structure comprising:
an identification field for storing a unique identifier of the control access data structure;
one or more object identification fields for associating the control access data structure with the one or more objects of the computing environment; and
wherein the control access data structure corresponds to an access control entry of the one or more objects, and wherein the access control entry associates the access right with a trusted user of the computing environment.

2. The computer-readable medium of claim 1, wherein an individual object identification field of the control access data structure stores a unique identifier of an associated object.

3. The computer-readable medium of claim 1 having further stored thereon one or more access control entries (ACE's), wherein each ACE includes a rights field for associating the control access data structure with one of the one or more objects.

4. The computer-readable medium of claim 3, wherein the rights field of each ACE stores the unique identifier of the control access data structure.

5. The computer-readable medium of claim 3, wherein each ACE further includes a trusted user field for associating an ACE with the trusted user of the computing environment.

6. The computer-readable medium of claim 5, wherein the trusted user field of each ACE stores a unique identifier of the trusted user.

7. A computing system comprising:
an operating system configured to execute on the computing system, the operating system having a set of predefined permissions for performing corresponding operations on objects within the computing system;
an administrative tool configured to execute on the computing system and direct the operating system to:
generate a control access right that defines a permission to perform a desired operation on an individual object within the computing system; and
associate the control access right with an access control entry corresponding to the individual object within the computing system.

8. The computing system of claim 7, further comprising a control access data structure that defines the control access right.

9. The computing system of claim 8, wherein the administrative tool is further configured to direct the operating system to associate the control access data structure with a user in order to grant the user the right to perform the desired operation on the individual object.

10. The computing system of claim 7, wherein the operating system is further configured to associate the control access data structure with the user by storing a unique identifier of the user within the access control entry that is associated with the access control list of the individual object.

11. The computing system of claim 8, wherein the operating system is further configured to authorize a user request to perform the desired operation on the individual object as a function of the control access data structure.

12. The computing system of claim 8, wherein the operating system is further configured to define the control access data structure, and maintain a unique identifier of the individual object within the control access data structure.

13. The computing system of claim 12, wherein the operating system is further configured to associate the control access data structure with the individual object by maintaining a unique identifier of the control access data structure within a field of the access control entry, and by associating the access control entry with an access control list stored in the individual object.

14. A computer program for controlling user requested operations on an object in a computing environment having a set of predefined access rights, the computer program being stored on a machine readable medium and comprising:
means for defining an access right component that defines a permission corresponding to a desired operation of the object;
means for associating the access right component with the object;
means for associating the access right component with an access control entry corresponding to the object; and
means for associating the access right component with a user in order to grant the desired operation.

15. The computer program of claim 14, further comprising an administrative tool for controlling the defining means.

16. The computer program of claim 14, further comprising an interface for allowing a user application to programmatically control the defining means.

17. The computer program of claim 14, wherein the means for associating the access right component with the object includes means for storing a unique identifier of the object within a field of a control access data structure created by the defining means.

18. The computer program of claim 14, wherein the means for associating the access right component with the user includes:
means for adding the access control entry (ACE) to an access control list (ACL) that corresponds to the object;
means for storing a unique identifier of a control access data structure within a first field of the ACE; and
means for storing a unique identifier of the user within a second field of the ACE.

19. A method comprising:
creating an access control entry as a component of an access control list that is associated with at least one object in a computing environment, the access control entry identifying a security principal;
defining an extensible access right component that defines access to one or more operations of the at least one object;

associating the extensible access right component with the access control entry such that the security principal is authorized to access the one or more operations of the at least one object.

20. A method as recited in claim 19, wherein defining includes creating the extensible access right component as a component of the access control entry.

21. A method as recited in claim 19, wherein defining the extensible access right component includes defining access to a property of the at least one object.

22. A method as recited in claim 19, wherein defining the extensible access right component includes defining access to a method exposed by the at least one object.

23. A method as recited in claim 19, wherein defining the extensible access right component includes defining access to a property of the at least one object, and wherein associating includes associating the extensible access right component with the security principal such that the security principal is authorized to access the property of the at least one object.

24. A method as recited in claim 19, wherein defining the extensible access right component includes defining access to a method exposed by the at least one object, and wherein associating includes associating the extensible access right component with the security principal such that the security principal is authorized to initiate the method.

25. A method as recited in claim 19, wherein defining includes an application executing in the computing environment defining the extensible access right component.

26. A method as recited in claim 19, wherein defining includes an application executing in the computing environment defining the extensible access right component as a component of the access control entry.

27. A method as recited in claim 19, wherein defining includes creating a control access data structure, and wherein associating includes maintaining a unique identifier of the at least one object with the control access data structure.

28. A method as recited in claim 19, wherein associating includes the access control entry maintaining a unique identifier of the extensible access right component.

29. A method as recited in claim 19, wherein associating includes the access control entry maintaining a unique identifier of a control access data structure that represents the extensible access right component.

30. One or more computer-readable media comprising computer executable instructions that, when executed, direct a computing system to perform the method of claim 19.

31. One or more computer-readable media maintaining an extensible control access right comprising:
 a control access data structure that includes:
  an identification field to maintain a unique identifier of the control access data structure;
  an object identification field to maintain a unique identifier of an object within a computing environment, the object identification field configured to associate the control access data structure with the object; and
  wherein the control access data structure defines access by an authorized security principal to one or more operations of the object.

32. One or more computer-readable media as recited in claim 31, wherein the control access data structure further includes at least one other object identification field to maintain a second unique identifier of at least one other object within the computing environment, the one other object identification field configured to associate the control access data structure with the one other object.

33. One or more computer-readable media as recited in claim 31, the extensible control access right further comprising an access control entry that is associated with the object, the access control entry configured to maintain the unique identifier of the control access data structure to associate the control access data structure with the object.

34. One or more computer-readable media as recited in claim 31, the extensible control access right further comprising an access control entry that is associated with the object, the access control entry configured to:
 associate the control access data structure with the object; and
 associate the authorized security principal with the object and with the control access data structure.

35. One or more computer-readable media as recited in claim 31, the extensible control access right further comprising an access control entry that is associated with the object, the access control entry configured to maintain:
 a unique identifier of the control access data structure to associate the control access data structure with the object; and
 a unique identifier of the authorized security principal to associate the authorized security principal with the object and with the control access data structure.

36. A computing system comprising:
 an operating system to manage one or more objects within the computing system, an individual object having an access control list of predefined operating system permissions to perform corresponding operations on the individual object;
 an access control entry to identify a security principal, the access control entry associated with the individual object as a component of the access control list;
 an extensible access right to define access to one or more operations of the individual object, the extensible access right associated with the access control entry such that the security principal is authorized to access the one or more operations of the individual object.

37. A computing system as recited in claim 36, further comprising an application to generate a control access data structure that defines the extensible access right.

38. A computing system as recited in claim 36, further comprising a control access data structure that defines the extensible access right, the control access data structure configured to maintain a unique identifier of the individual object.

39. A computing system as recited in claim 36, further comprising a control access data structure that defines the extensible access right, the control access data structure configured to maintain a unique identifier of the individual object, and wherein the access control entry is configured to maintain a unique identifier of the control access data structure to associate the control access data structure with the individual object and with the security principal.

40. A computing system as recited in claim 36, wherein the access control entry is configured to maintain a unique identifier of the security principal to associate the security principal with the individual object.

41. A computing system as recited in claim 36, wherein the extensible access right further defines access to a property of the individual object.

42. A computing system as recited in claim 36, wherein the extensible access right further defines access to a method exposed by the individual object.

43. A computing system as recited in claim 36, wherein the extensible access right further defines access to a property of the individual object, the extensible access right associated with the access control entry such that the security principal is authorized to access the property of the individual object.

44. A computing system as recited in claim 36, wherein the extensible access right further defines access to a method exposed by the individual object, the extensible access right associated with the access control entry such that the security principal is authorized to initiate the method.

45. A computing system as recited in claim 36, further comprising a control access data structure that defines the extensible access right, and wherein the extensible access right can be redefined with a change of values maintained by the control access data structure.

46. A computing system as recited in claim 36, further comprising a control access data structure that defines the extensible access right, and wherein the extensible access right can be redefined without a change to the access control entry.

* * * * *